(12) United States Patent
Wang et al.

(10) Patent No.: US 11,258,552 B2
(45) Date of Patent: Feb. 22, 2022

(54) METHOD OF TRANSMITTING SOUNDING REFERENCE SIGNAL AND DEVICE UTILIZING SAME

(71) Applicant: XI'AN ZHONGXING NEW SOFTWARE CO., LTD., Shaanxi (CN)

(72) Inventors: Yuxin Wang, Shenzhen (CN); Yu Ngok Li, Shenzhen (CN); Yijian Chen, Shenzhen (CN); Zhaohua Lu, Shenzhen (CN); Yong Li, Shenzhen (CN); Huahua Xiao, Shenzhen (CN); Jianxing Cai, Shenzhen (CN); Hao Wu, Shenzhen (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 0 days.

(21) Appl. No.: 15/773,925

(22) PCT Filed: Oct. 24, 2016

(86) PCT No.: PCT/CN2016/103097
§ 371 (c)(1),
(2) Date: May 4, 2018

(87) PCT Pub. No.: WO2017/076182
PCT Pub. Date: May 11, 2017

(65) Prior Publication Data
US 2018/0331797 A1    Nov. 15, 2018

(30) Foreign Application Priority Data

Nov. 6, 2015  (CN) .......................... 201510752876.6

(51) Int. Cl.
H04L 5/00    (2006.01)
H04L 5/14    (2006.01)
H04L 27/26   (2006.01)

(52) U.S. Cl.
CPC ............ *H04L 5/0007* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS 8,320,267 B2  11/2012  Wei
8,913,578 B2  12/2014  Noh et al.
(Continued)

FOREIGN PATENT DOCUMENTS

CN   101335969 A   12/2008
CN   101404794 A   4/2009
(Continued)

OTHER PUBLICATIONS

LG Electronics 3GPP TSGRANWG1Meeting#82bis (Year: 2015).*
(Continued)

*Primary Examiner* — Ajit Patel
*Assistant Examiner* — Pamit Kaur
(74) *Attorney, Agent, or Firm* — McDonald Hopkins LLC (57) ABSTRACT

The invention provides a method of transmitting a sounding reference signal (SRS) and a device utilizing the same. The method comprises: a user equipment transmits, to a base station, a sounding reference signal (SRS) on a time domain symbol in a special subframe, wherein the time domain symbol comprises one or more time domain symbols of time domain symbols occupying an uplink pilot time slot; and a number of the time domain symbols occupying the uplink
(Continued)

pilot time slot is N, N is an integer, and 3≤N≤12. The embodiment resolves a problem of an incomplete scheme of transmitting an SRS on a time domain symbol, and realizes transmission of an SRS on increased time domain symbols.

2 Claims, 4 Drawing Sheets

(52) U.S. Cl.
CPC .......... *H04L 5/0082* (2013.01); *H04L 5/0091* (2013.01); *H04L 5/1469* (2013.01); *H04L 5/0023* (2013.01); *H04L 27/261* (2013.01)

(56) References Cited

U.S. PATENT DOCUMENTS

| | | |
|---|---|---|
| 2010/0309852 A1 | 12/2010 | Li |
| 2010/0322115 A1 | 12/2010 | Wei |
| 2012/0224557 A1 | 9/2012 | Noh |
| 2013/0128855 A1 | 5/2013 | Noh |
| 2014/0355546 A1 | 12/2014 | Noh et al. |
| 2015/0163035 A1 | 6/2015 | Li et al. |
| 2015/0172030 A1 | 6/2015 | Tiirola |
| 2016/0338049 A1* | 11/2016 | Takeda .............. H04W 72/0446 |
| 2016/0338050 A1* | 11/2016 | Kim ........................ H04W 4/70 |
| 2017/0048039 A1 | 2/2017 | Zhao et al. |
| 2017/0048717 A1* | 2/2017 | Yoo ........................ H04L 5/1469 |
| 2018/0213552 A1* | 7/2018 | Wei ........................ H04L 5/0051 |
| 2018/0227894 A1 | 8/2018 | Noh et al. |

FOREIGN PATENT DOCUMENTS

| | | |
|---|---|---|
| CN | 101500264 A | 8/2009 |
| CN | 101795473 A | 8/2010 |
| CN | 102694637 A | 9/2012 |
| CN | 102742195 A | 10/2012 |
| CN | 104488213 A | 4/2015 |
| WO | 2014005632 A1 | 1/2014 |
| WO | 20151088008 A1 | 7/2015 |
| WO | 2015122723 A1 | 8/2015 |
| WO | 2015163709 A1 | 10/2015 |

OTHER PUBLICATIONS

International Search Report in international application No. PCT/CN2016/103097, dated Jan. 12, 2017.
English Translation of the Written Opinion of the International Search Authority in international application No. PCT/CN2016/103097, dated Jan. 12, 2017.
Discussion on SRS capacity improvement, 3GPP TSG RATWG1 Meeting# 82, Aug. 2015.
Discussion on SRS capacity improvement options, 3GPP TSG RATWG1 Meeting#82, Aug. 2015.
NTT Docomo: "TDD Operation and SRS Enhancement for Elevation BF and FD-MIMO", 3GPP Draft; R1-155763 TDD SRS, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015 Oct. 4, 2015 (Oct. 4, 2015), XP051039743 Retrieved from the Internet: URL:http://www.3gpp.org/ftp/, 3GPP TSG RAN WG1 meeting#82bis.
CMCC: "Discussion on SRS capacity improvement", 3GPP Draft; R1-154303, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015 Aug. 23, 2015 (Aug. 23, 2015), XP051001631, Retrieved from the Internet: URL:http://www.3gpp.org/ftp/Meetings_3GPP_SYNC/RAN1/Docs/[retrieved on Aug. 23, 2015] * figure 1* * sections 1,2, 2.2 *.
LG Electronics: "Furtner details on SRS capacity improvement schemes", 3GPP Draft; R1-155398, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015 Oct. 4, 2015 (Oct. 4, 2015), XP051002305, Retrieved from the Internet: URL:http://www.3gpp.org/ftp/, 3GPP TSG RAN WG1 Meeting #82bis.
Partial Supplementary European Search Report in European application No. 16861450.1, dated Sep. 25, 2018.
Samsung:"Multiple Aperiodic SRS Triggers for Same Configuration", 3GPP Draft; RI-111990 Draft CR TS362138.2, 3rd Generation Partnership Project (3GPP), Mobile Competence Centre; 650, Route Des Lucioles ; F-06921 Sophia-Antipolis Cedex ; FRANCE, vol. RAN WG1, No. Barcelona, Spain; May 9, 2011, May 16, 2011 (May 16, 2011), XP050491607, [retrieved on May 16, 2011] * tables 8.2.1-8.2.4 * section 8.2 *.
Supplementary European Search Report in European application No. 16861450.1, dated Jan. 15, 2019.
ZTE: "Discussion on SRS capacity improvement", 3GPP Draft; R1-155265, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 4, 2015, XP051002224, Retrieved from the Internet: URL:http://www.3gpp.org/ftp/ Meetings_3GPP_SYNC/RAN1/Docs/ [retrieved on Oct. 14, 2015].
Samsung: "Discussion on SRS capacity improvement options", 3GPP Draft; R1-155485, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 4, 2015, XP051002388, Retrieved from the Internet: URL:http://www. 3gpp.org/ftp/Meetings_3GPP_SYNC/RAN1/Docs/ [retrieved on Oct. 4, 2015].
Samsung: "Additional special subframe configuration for LTE TDD", 3GPP Draft; R1-121651, 3rd Generation Partnership Project (3GPP), Mobile Competence Centre ; 650, Route Des Lucioles ; F-06921 Sophia-Antipolis Cedex ; France, vol. RAN WG1, No. Jeju, Korea; Mar. 20, 2012, XP050599914, [retrieved or Mar. 20, 2012].
European Office Action dated Sep. 7, 2020; European Patent Application No. 16 861 450.1-1205.
First Search Report dated Nov. 14, 2019, Chinese Application No. 201510752876.6.
First Office Action dated Nov. 25, 2019, Chinese Application No. 201510752876.6.
First Office Action dated Jun. 9, 2020, Chinese Application No. 201510752876.6.

* cited by examiner

METHOD OF TRANSMITTING SOUNDING REFERENCE SIGNAL AND DEVICE UTILIZING SAME

TECHNICAL FIELD

The disclosure relates to the field of communications, and more particularly to a method and device for sending a Sounding Reference Signal (SRS).

BACKGROUND

Figure 1:
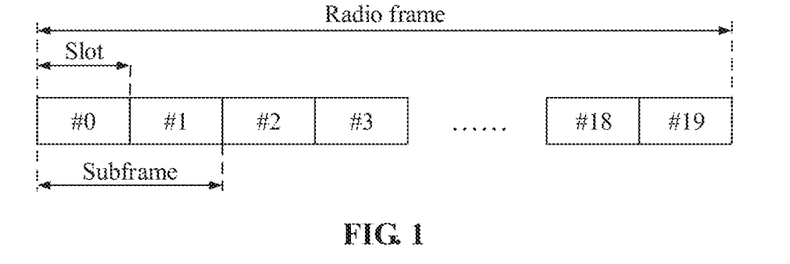
FIG. 1 is a schematic diagram of a frame structure in an FDD mode according to the related art.
Figure 2:
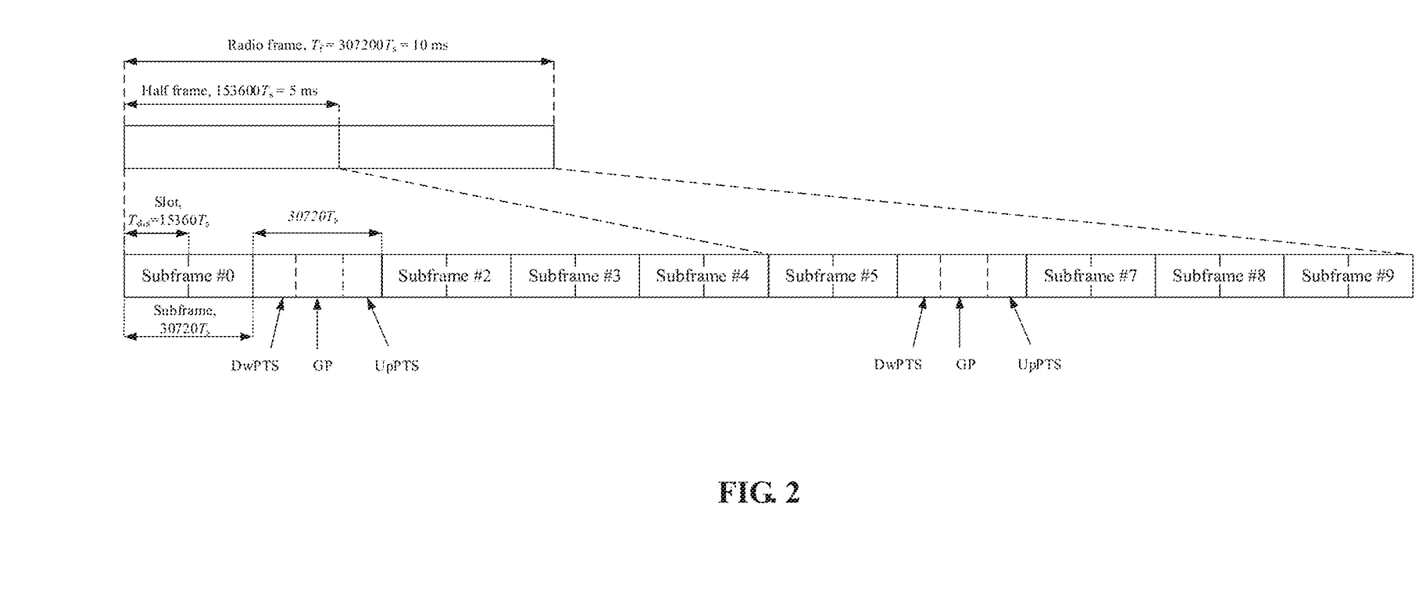
FIG. 2 is a schematic diagram of a frame structure in a TDD mode according to the related art.

Radio frames in a Long Term Evolution (LTE) system may have frame structures in a Frequency Division Duplex (FDD) mode or a Time Division Duplex (TDD) mode. FIG. 1 is a schematic diagram of a frame structure in an FDD mode according to the related art. As shown in FIG. 1, a 10-millisecond (ms) radio frame is formed by 20 slots numbered from 0 to 19, each having a length of 0.5 ms, and the slots 2i and 2i+1 form a subframe i with a length of 1 ms. FIG. 2 is a schematic diagram of a frame structure in a TDD mode according to the related art. As shown in FIG. 2, a 10 ms radio frame is formed by two half frames, each having a length of 5 ms, each half frame includes 5 subframes, each having a length of 1 ms, and the subframe i is defined into two slots 2i and 2i+1, each having a length of 0.5 ms.

In the two frame structures, for normal Cyclic Prefixes (CPs), a slot includes 7 symbols with a length of 66.7 microseconds (us), wherein the CP length of the first symbol is 5.21 us, and the CP length of each of the other 6 symbols is 4.69 us; and for extended CPs, a slot includes 6 symbols, and the CP length of each of the symbols is 16.67 us. A time unit $T_s$ is defined to be $T_s=1/(15,000 \times 2,048)$ seconds, and supported Uplink (UL)/Downlink (DL) configurations are shown in Table 1. For each subframe in a radio frame, "D" represents a subframe dedicated to downlink (DL) transmission, "U" represents a subframe dedicated to uplink (UL) transmission, and "S" represents special subframes for three domains, i.e., a Downlink Pilot Time Slot (DwPTS), a Guard Period (GP) and an Uplink Pilot Time Slot (UpPTS). Lengths of the DwPTS and the UpPTS are shown in Table 2, and a total length of the DwPTS, the GP and the UpPTS is $30,720 \cdot T_s = 1$ ms. Each subframe i is represented by two slots 2i and 2i+1, and a length of each slot is $T_{slot}=15,360 \cdot T_s=0.5$ ms.

LTE TDD supports UL/DL switching periods of 5 ms and 10 ms. If a DL-to-UL switching point period is 5 ms, special subframes may exist in two half frames; and if the DL-to-UL switching point period is 10 ms, the special subframes may exist in the first half frame only. Subframe 0, subframe 5 and DwPTS are always configured for DL transmission UpPTS and subframe(s) immediately following the special subframes are dedicated to UL transmission.

Table 1 shows UL/DL configurations, as shown in Table 1; and

Table 2 shows special subframe configurations (DwPTS/GP/UpPTS length), as shown in Table 2.

TABLE 1

| UL-DL configuration | DL-UL switching point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Special subframe configuration | Normal CP, DL | | | Extended CP, DL | | |
|---|---|---|---|---|---|---|
| | DwPTS | UpPTS Normal CP, UL | UpPTS Extended CP, UL | DwPTS | UpPTS Normal CP, UL | UpPTS Extended CP, UL |
| 0 | $6,592 \cdot T_s$ | $2,192 \cdot T_s$ | $2,560 \cdot T_s$ | $7,680 \cdot T_s$ | $2,192 \cdot T_s$ | $2,560 \cdot T_s$ |
| 1 | $19,760 \cdot T_s$ | | | $20,480 \cdot T_s$ | | |
| 2 | $21,592 \cdot T_s$ | | | $23,040 \cdot T_s$ | | |
| 3 | $24,144 \cdot T_s$ | | | $25,600 \cdot T_s$ | | |
| 4 | $26,336 \cdot T_s$ | | | $7,680 \cdot T_s$ | $4,384 \cdot T_s$ | $5,120 \cdot T_s$ |
| 5 | $6,592 \cdot T_s$ | $4,384 \cdot T_s$ | $5,120 \cdot T_s$ | $20,480 \cdot T_s$ | | |
| 6 | $19,760 \cdot T_s$ | | | $23,040 \cdot T_s$ | | |
| 7 | $21,592 \cdot T_s$ | | | — | — | — |
| 8 | $24,144 \cdot T_s$ | | | — | — | — |

In an LTE system, a Physical Downlink Control Channel (PDCCH) is used to carry UL and DL scheduling information and UL power control information. Downlink Control Information (DCI) formats are divided into DCI formats 0, 1, 1A, 1B, 1C, 1D, 2, 2A, 3, 3A and the like. An e-Node-B (eNB) may configure User Equipment (UE) through DCI, or the LE accepts configuration of higher layers, that is, the UE is configured through higher layer signaling.

Broadcast information of the LTE system is divided into a Master Information Block (MIB) and a System Information Block(s) (SIB). The MIB is transmitted on a Physical Broadcast Channel (PBCH), and the SIB(s) (also referred to as Scheduled Information (SI)) are transmitted on a Physical Downlink Shared Channel (PDSCH). According to different scheduling requirements (for example, periods), the SIB information is further divided into a plurality of pieces of SI for transmission, and the system supports at least four pieces of SI (i.e., SIB-1, SIB-2, SIB-3 and SIB-4).

An SRS is a signal between UE and an eNB for measuring Channel State Information (CSI). In the LTE system, UE regularly sends a UL SRS on the last data symbol of a sending subframe according to parameters indicated by an eNB, for example, bandwidth, frequency-domain location, sequence cyclic shift, period and subframe offset. The eNB judges UL CSI of the UE according to the received SRS and executes operations of frequency-domain selection scheduling, closed-loop power control and the like according to the obtained CSI.

In the same SRS bandwidth, multiple UEs may use different cyclic shifts on the same frequency comb and then send SRSs in a code division multiplexing manner, or two UEs may send SRSs on different frequency combs in a frequency division multiplexing manner. For example, in the LTE system, UEs sending SRSs in a certain SRS bandwidth (4 Resource Blocks (RBs)) may use 8 cyclic shifts and may use 2 frequency combs, so that there are totally 16 available resources for sending the SRSs for the UEs, that is, at most 16 SRSs may be sent at the same time in the SRS bandwidth. Since UL Single User Multiple Input Multiple Output (SU-MIMO) is not supported in the LTE system, there is only one antenna for a single UE to send SRSs at every time instant, and thus the UE requires only one SRS resource. Therefore, in the SRS bandwidth, the system may multiplex at most 16 UEs at the same time.

An LTE-Advanced (LTE-A) system is a next-generation evolved system of the LTE system, supports UL SU-MIMO and may use at most 4 antennae as UL transmitting antennae. That is, a single UE may send SRSs on multiple antennae at the same time, and an eNB may estimate a state on each channel according to the SRSs received on each antenna.

It is proposed in existing LTE-A researches that, non-precoded (namely antenna-specific) SRSs should be used in UL communication. At this moment, when a UE uses multiple antennae to send non-precoded SRSs, SRS resources required by the UE may be increased, and this inevitably reduces the number of UEs which may be multiplexed at the same time in the system. In addition, not only is periodic SRS sending in the original LTE system reserved, but also aperiodic SRS sending may be configured for the UE through DCI or higher layer signaling.

For example, in a certain SRS bandwidth (4 RBs), if each UE uses 4 antennae to send SRSs, the number of resources required by each UE is 4. According to the total SRS resource number 16 supported in the SRS bandwidth, the number of UEs which may be multiplexed in the SRS bandwidth is reduced to 4. The number of users that may be multiplexed at the same time in the system is ¼ of original LTE system. It is proposed in existing LTE-A release 10 researches that UE may send SRSs in two triggering manners, i.e., higher layer signaling (also referred to as triggering through a trigger type 0) or DCI (also referred to as triggering through a trigger type 1), periodic SRSs are triggered on the basis of the higher layer signaling and aperiodic SRSs are triggered on the basis of the DCI. In LTE-A release 10, an aperiodic SRS sending manner is added to improve an SRS resource utilization rate to a certain extent and improve resource scheduling flexibility.

In future LTE-A release 13 researches, in a scenario of configuring full-dimension-MIMO or massive-MIMO, along with increase of an SRS measurement requirement of TDD channel reciprocity and increase of the number of multiplexed users, it has become very unlikely for an existing SRS multiplexing capacity to meet the requirement.

A manner of adding a time-domain symbol (for example, an UpPTS) for sending an SRS is proposed in the related art. However, for how to send the SRS on the added time-domain symbol, there is yet no effective solution proposed at present.

For the problem in the related art that a technical solution of sending an SRS on a time-domain symbol is imperfect, there is yet no effective solution at present.

SUMMARY

Embodiments of the disclosure provide a method and device for sending an SRS, so as to at least solve the problem in the related art that a technical solution of sending an SRS on a time-domain symbol is imperfect.

According to an embodiment of the disclosure, an Method for sending an SRS is provided, which may include that:

UE sends an SRS to an eNB on a time-domain symbol of a special subframe, wherein the time-domain symbol may include one or more of time-domain symbols occupied by an UpPTS, and a number of the time-domain symbols occupied by the UpPTS may be N, where N may be an integer no less than 3 and no greater than 12.

Furthermore, the operation that the UE sends the SRS to the eNB on the special subframe may include that:

the UE sends the SRS to the eNB according to predefined configuration information, wherein the predefined configuration information may include at least one of the following: determining a time-domain symbol location for sending the SRS according to parity of a sequence number of a subframe n where an SRS triggering request detected by the UE is located; or determining the time-domain symbol location for sending the SRS according to a range of the subframe n where the SRS triggering request detected by the UE is located.

Furthermore, the operation of determining the time-domain symbol location for sending the SRS according to the parity of the sequence number of the subframe n where the SRS triggering request detected by the UE is located may include that:

when the sequence number of the subframe n where the SRS triggering request detected by the UE is located is an odd number, it is predefined that the aperiodic SRS is sent on a newly added UpPTS or a UE-specific UpPTS of standard Release 13 (Rel-13) and later, and when the sequence number of the subframe n where the SRS triggering request detected by the UE is located is an even number, it is predefined that the aperiodic SRS is sent on a conventional UpPTS; or, when the sequence number of the subframe n where the SRS triggering request detected by the UE is located is an even number, it is predefined that the aperiodic SRS is sent on the newly added UpPTS or the UE-specific UpPTS of standard Rel-13 and later, and when the sequence number of the subframe n where the SRS triggering request detected by the UE is located is an odd number, it is predefined that the aperiodic SRS is sent on the conventional UpPTS, wherein the conventional UpPTS may be an UpPTS occupying last two or last one time-domain symbol in the special subframe.

Furthermore, the operation of determining the time-domain symbol location for sending the SRS according to the range of the subframe n where the SRS triggering request detected by the UE is located may include that:

when the sequence number of the subframe n where the SRS triggering request detected by the UE is located is 0 or 1 or 3 or 4, it is predefined that the aperiodic SRS is sent on the newly added UpPTS or the UE-specific UpPTS of standard Rel-13 and later, and when the sequence number of the subframe n where the SRS triggering request detected by the UE is located is 5 or 6 or 8 or 9, it is predefined that the aperiodic SRS is sent on the conventional UpPTS; or, when the sequence number of the subframe n where the SRS triggering request detected by the UE is located is 5 or 6 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 3 or 4, it is predefined that the aperiodic SRS is sent on the conventional UpPTS; or, when the sequence number of the subframe n where the SRS triggering request detected by the UE is located is 3 or 4 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 5 or 6, it is predefined that the aperiodic SRS is sent on the conventional UpPTS, wherein the conventional UpPTS may be the UpPTS occupying the last two or last one time-domain symbol in the special subframe.

Furthermore, the time-domain symbol location in the special subframe for sending the SRS by the UE may be related to at least one of the following parameters: the parity of the sequence number of the subframe n where the SRS triggering request detected by the UE is located, or an SRS sending period and subframe offset configuration of the UE.

Furthermore, before the operation that the UE sends the SRS to the eNB on the time-domain symbol of the special subframe, the method may further include that: the UE receives configuration information sent by the eNB, wherein the configuration information may include at least one of the following: the SRS sending period and subframe offset configuration of the UE, a corresponding relationship among a subframe index, an UpPTS index and a sending subframe index of the SRS, or indication information indicating a time-domain location for sending the SRS; and the operation that the UE sends the SRS to the eNB on the special subframe may include that: the UE sends the SRS to the eNB according to the configuration information.

Furthermore, the SRS sending period and subframe offset configuration of the UE may include at least one of the following:

an SRS sending period value of the UE is 2 and an SRS subframe offset value is 0 and 1;

the SRS sending period value of the UE is 2 and the SRS subframe offset value is 0 and 2;

the SRS sending period value of the UE is 2 and the SRS subframe offset value is 0 and 3;

the SRS sending period value of the UE is 2 and the SRS subframe offset value is 1 and 2;

the SRS sending period value of the UE is 2 and the SRS subframe offset value is 1 and 3;

the SRS sending period value of the UE is 2 and the SRS subframe offset value is 2 and 3;

the SRS sending period value of the UE is 1 or 2 and the SRS subframe offset value is 0, 1 and 2;

the SRS sending period value of the LE is 1 or 2 and the SRS subframe offset value is 0, 1 and 3;

the SRS sending period value of the UE is 1 or 2 and the SRS subframe offset value is 0, 2 and 3;

the SRS sending period value of the UE is 1 or 2 and the SRS subframe offset value is 1, 2 and 3; or the SRS sending period value of the UE is 1 or 2 and the SRS subframe offset value is 0, 1, 2 and 3.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 0;

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 6 and is the first time-domain symbol occupied by the UpPTS, the sending subframe index of the SRS is 4;

when the subframe index is 6 and is the second time-domain symbol occupied by the UpPTS, the sending subframe index of the SRS is 5;

when the subframe index is 6 and is the third time-domain symbol occupied by the UpPTS, the sending subframe index of the SRS is 6; or when the subframe index is 6 and is the fourth time-domain symbol occupied by the UpPTS, the sending subframe index of the SRS is 7.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 6 and is the first time-domain symbol occupied by the UpPTS, the sending subframe index of the SRS is 6; or when the subframe index is 6 and is the second time-domain symbol occupied by the UpPTS, the sending subframe index of the SRS is 7.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 0;

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 1 and is the fifth time-domain symbol occupied by the UpPTS, the sending subframe index of the SRS is 4:

when the subframe index is 1 and is the sixth time-domain symbol occupied by the UpPTS, the sending subframe index of the SRS is 5;

when the subframe index is 6 and is the first time-domain symbol occupied by the UpPTS, the sending subframe index of the SRS is 6;

when the subframe index is 6 and is the second time-domain symbol occupied by the UpPTS, the sending subframe index of the SRS is 7;

when the subframe index is 6 and is the third time-domain symbol occupied by the UpPTS, the sending subframe index of the SRS is 8;

when the subframe index is 6 and is the fourth time-domain symbol occupied by the UpPTS, the sending subframe index of the SRS is 9;

when the subframe index is 6 and is the fifth time-domain symbol occupied by the UpPTS, the sending subframe index of the SRS is 10; or when the subframe index is 6 and is the sixth time-domain symbol occupied by the UpPTS, the sending subframe index of the SRS is 11.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 1 and is the third time-domain symbol occupied by the UpPTS, the sending subframe index of the SRS is 4;

when the subframe index is 1 and is the fourth time-domain symbol occupied by the UpPTS, the sending subframe index of the SRS is 5;

when the subframe index is 6 and is the first time-domain symbol occupied by the UpPTS, the sending subframe index of the SRS is 8;

when the subframe index is 6 and is the second time-domain symbol occupied by the UpPTS, the sending subframe index of the SRS is 9;

when the subframe index is 6 and is the third time-domain symbol occupied by the UpPTS, the sending subframe index of the SRS is 10; or when the subframe index is 6 and is the fourth time-domain symbol occupied by the UpPTS, the sending subframe index of the SRS is 11.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 0;

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 6 and is the first time-domain symbol occupied by the UpPTS, the sending subframe index of the SRS is 5;

when the subframe index is 6 and is the second time-domain symbol occupied by the UpPTS, the sending subframe index of the SRS is 6;

when the subframe index is 6 and is the third time-domain symbol occupied by the UpPTS, the sending subframe index of the SRS is 7; or when the subframe index is 6 and is the fourth time-domain symbol occupied by the UpPTS, the sending subframe index of the SRS is 8.

Furthermore, the corresponding relationship among the subframe index, the UpPTS index and the sending subframe index of the SRS may include at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 6 and is the first time-domain symbol occupied by the UpPTS, the sending subframe index of the SRS is 7; or when the subframe index is 6 and is the second time-domain symbol occupied by the UpPTS, the sending subframe index of the SRS is 8.

Furthermore, when the SRS sending period is 1 or 2, the UE may send the SRS to the eNB on a subframe meeting the following relationship:

$$(A-B) \bmod 4 = 0,$$

$$\text{or, } (A-B) \bmod 5 = 0,$$

$$\text{or, } (A-B) \bmod 6 = 0,$$

where mod may be a modulus operation function, A may represent the sending subframe index of the SRS and B may represent the SRS subframe offset value.

Furthermore, the eNB may indicate the time-domain symbol location for sending the SRS through Radio Resource Control (RRC) signaling, or, may indicate the time-domain symbol location for sending the SRS through DL control signaling.

Furthermore, when the SRS sending period M is shorter than 5 ms, the SRS sending period M may represent that M SRS sending resources are configured in a half radio frame, or may represent that M SRS sending resources are configured in a newly added UpPTS of a special subframe of the half radio frame.

According to another embodiment of the disclosure, an Device for sending an SRS is provided, which may be applied to UE and include:

a sending module, arranged to send an SRS to an eNB on a time-domain symbol of a special subframe, wherein the time-domain symbol may include one or more of time-domain symbols occupied by an UpPTS, and a number of the time-domain symbols occupied by the UpPTS may be N, wherein N may be an integer no less than 3 and no greater than 12.

Furthermore, the device may further include:

a configuration module, arranged to, before the SRS is sent to the eNB on the time-domain symbol of the special subframe, receive configuration information sent by the eNB, wherein the configuration information may include at least one of the following: an SRS sending period and subframe offset configuration of the UE, a corresponding relationship among a subframe index, an UpPTS index and a sending subframe index of the SRS, or indication information indicating a time-domain location for sending the SRS; and the sending module may be arranged to send the SRS to the eNB according to the configuration information.

Furthermore, the sending module may be arranged to send the SRS to the eNB according to predefined configuration information, wherein the predefined configuration information may include at least one of the following: determining a time-domain symbol location for sending the SRS according to parity of a sequence number of a subframe n where an SRS triggering request detected by the UE is located; and determining the time-domain symbol location for sending the SRS according to a range of the subframe n where the SRS triggering request detected by the UE is located.

Furthermore, the sending module may include one of the following:

a first sending unit, arranged to, when the sequence number of the subframe n where the SRS triggering request detected by the UE is located is an odd number, predefine that the aperiodic SRS is sent on a newly added UpPTS or a UE-specific UpPTS of standard Rel-13 and later;

a second sending unit, arranged to, when the sequence number of the subframe n where the SRS triggering request detected by the UE is located is an even number, predefine that the aperiodic SRS is sent on a conventional UpPTS;

a third sending unit, arranged to, when the sequence number of the subframe n where the SRS triggering request detected by the UE is located is an even number, predefine that the aperiodic SRS is sent on the newly added UpPTS or the UE-specific UpPTS of standard Rel-13 and later; and a fourth sending unit, arranged to, when the sequence number of the subframe n where the SRS triggering request detected by the UE is located is an odd number, predefine that the aperiodic SRS is sent on the conventional UpPTS.

Furthermore, the sending module may further include one of the following:

a fifth sending unit, arranged to, when the sequence number of the subframe n where the SRS triggering request detected by the UE is located is 0 or 1 or 3 or 4, predefine that the aperiodic SRS is sent on the newly added UpPTS or the UE-specific UpPTS of standard Rel-13 and later;

a sixth sending unit, arranged to, when the sequence number of the subframe n where the SRS triggering request detected by the UE is located is 5 or 6 or 8 or 9, predefine that the aperiodic SRS is sent on the conventional UpPTS;

a seventh sending unit, arranged to, when the sequence number of the subframe n where the SRS triggering request detected by the UE is located is 5 or 6 or 8 or 9, predefine that the aperiodic SRS is sent on the newly added UpPTS or the UE-specific UpPTS of standard Rel-13 and later;

an eighth sending unit, arranged to, when the sequence number of the subframe n where the SRS triggering request detected by the UE is located is 0 or 1 or 3 or 4, predefine that the aperiodic SRS is sent on the conventional UpPTS;

a ninth sending unit, arranged to, when the sequence number of the subframe n where the SRS triggering request detected by the UE is located is 3 or 4 or 8 or 9, predefine that the aperiodic SRS is sent on the newly added UpPTS or the UE-specific UpPTS of standard Rel-13 and later; and a tenth sending unit, arranged to, when the sequence number of the subframe n where the SRS triggering request detected by the UE is located is 0 or 1 or 5 or 6, predefine that the aperiodic SRS is sent on the conventional UpPTS.

In the embodiments of the disclosure, a computer storage medium is further provided, which may store executable instructions which, when being executed, implement the Method for sending an SRS in the abovementioned embodiment.

According to the embodiments of the disclosure, the UE sends the SRS to the eNB on the time-domain symbol of the special subframe, wherein the time-domain symbol includes the one or more of the time-domain symbols occupied by the UpPTS, and the number of the time-domain symbols occupied by the UpPTS is N, wherein N is an integer no less than 3 and no greater than 12. The problem that a technical solution of sending an SRS on a time-domain symbol is imperfect is solved, and sending of the SRS on the added time-domain symbol is implemented.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are adopted not to describe a specific sequence or order but to distinguish similar objects.

Figure 3:
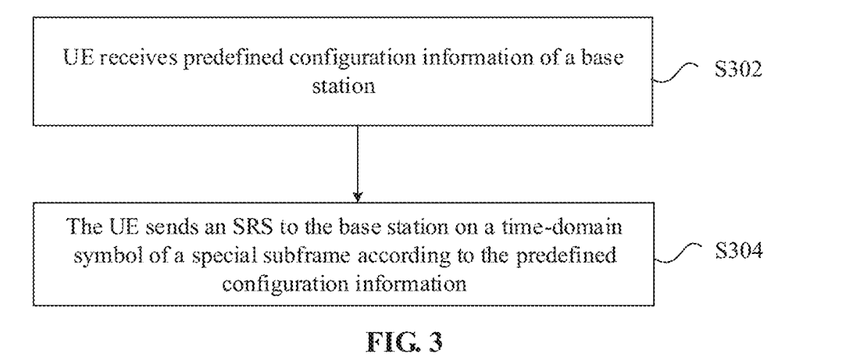
FIG. 3 is a flowchart of an Method for sending an SRS according to an embodiment of the disclosure.

An embodiment provides an Method for sending an SRS. FIG. 3 is a flowchart of an Method for sending an SRS according to an embodiment of the disclosure. As shown in FIG. 3, the flow includes the following steps.

In S302, a UE receives predefined configuration information of an eNB.

In S304, the UE sends an SRS to the eNB on a time-domain symbol of a special subframe according to the predefined configuration information.

By the steps, the UE receives the predefined configuration information of the eNB, and the UE sends the SRS to the eNB on the time-domain symbol of the special subframe according to the predefined configuration information. The problem that a technical solution of sending an SRS on a time-domain symbol is imperfect is solved, and sending of the SRS on the added time-domain symbol is implemented.

In the embodiment, the operation that the UE sends the SRS to the eNB on the special subframe includes that:

the UE sends the SRS to the eNB according to the predefined configuration information, wherein the predefined configuration information includes at least one of the following: determining a time-domain symbol location for sending the SRS according to parity of a sequence number of a subframe n where an SRS triggering request detected by the UE is located; and determining the time-domain symbol location for sending the SRS according to a range of the subframe n where the SRS triggering request detected by the UE is located.

In the embodiment, the operation that the time-domain symbol location for sending the SRS is determined according to the parity of the sequence number of the subframe n where the SRS triggering request detected by the UE is located includes that:

when the sequence number of the subframe n where the SRS triggering request detected by the UE is located is an odd number it is predefined that the aperiodic SRS is sent on a newly added UpPTS or a UE-specific UpPTS of standard Rel-13 and later, and when the sequence number of the subframe n where the SRS triggering request detected by the UE is located is an even number, it is predefined that the aperiodic SRS is sent on a conventional UpPTS; or, when the sequence number of the subframe n where the SRS triggering request detected by the UE is located is an even number, it is predefined that the aperiodic SRS is sent on the newly added UpPTS or the UE-specific UpPTS of standard Rel-13 and later, and when the sequence number of the subframe n where the SRS triggering request detected by the UE is located is an odd number, it is predefined that the aperiodic SRS is sent on the conventional UpPTS.

In the embodiment, the operation that the time-domain symbol location for sending the SRS is determined according to the range of the subframe n where the SRS triggering request detected by the UE is located includes that:

when the sequence number of the subframe n where the SRS triggering request detected by the UE is located is 0 or 1 or 3 or 4, it is predefined that the aperiodic SRS is sent on the newly added UpPTS or the UE-specific UpPTS of standard Rel-13 and later, and when the sequence number of the subframe n where the SRS triggering request detected by the UE is located is 5 or 6 or 8 or 9, it is predefined that the aperiodic SRS is sent on the conventional UpPTS; or, when the sequence number of the subframe n where the SRS triggering request detected by the UE is located is 5 or 6 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 3 or 4, it is predefined that the aperiodic SRS is sent on the conventional UpPTS; or, when the sequence number of the subframe n where the SRS triggering request detected by the UE is located is 3 or 4 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 5 or 6, it is predefined that the aperiodic SRS is sent on the conventional UpPTS, wherein the conventional UpPTS is an UpPTS occupying last two or last one time-domain symbol in the special subframe.

In the embodiment, before the operation that the UE sends the SRS to the eNB on the time-domain symbol of the special subframe, the method further includes that: the UE receives configuration information sent by the eNB, wherein the configuration information includes at least one of the following: an SRS sending period and subframe offset configuration of the UE, a corresponding relationship among a subframe index, an UpPTS index and a sending subframe index of the SRS, or indication information indicating a time-domain location for sending the SRS; and the operation that the UE sends the SRS to the eNB on the special subframe includes that: the UE sends the SRS to the eNB according to the configuration information.

In the embodiment, the SRS sending period and subframe offset configuration of the UE include at least one of the following:

an SRS sending period value of the UE is 2 and an SRS subframe offset value is 0 and 1;

the SRS sending period value of the UE is 2 and the SRS subframe offset value is 0 and 2;

the SRS sending period value of the UE is 2 and the SRS subframe offset value is 0 and 3;

the SRS sending period value of the UE is 2 and the SRS subframe offset value is 1 and 2;

the SRS sending period value of the UE is 2 and the SRS subframe offset value is 1 and 3;

the SRS sending period value of the UE is 2 and the SRS subframe offset value is 2 and 3;

the SRS sending period value of the UE is 1 or 2 and the SRS subframe offset value is 0, 1 and 2;

the SRS sending period value of the UE is 1 or 2 and the SRS subframe offset value is 0, 1 and 3;

the SRS sending period value of the UE is 1 or 2 and the SRS subframe offset value is 0, 2 and 3;

the SRS sending period value of the UE is 1 or 2 and the SRS subframe offset value is 1, 2 and 3; or the SRS sending period value of the UE is 1 or 2 and the SRS subframe offset value is 0, 1, 2 and 3.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 0:

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 6 and is the first time-domain symbol occupied by the UpPTS, the sending subframe index of the SRS is 4;

when the subframe index is 6 and is the second time-domain symbol occupied by the UpPTS, the sending subframe index of the SRS is 5;

when the subframe index is 6 and is the third time-domain symbol occupied by the UpPTS, the sending subframe index of the SRS is 6; or when the subframe index is 6 and is the fourth time-domain symbol occupied by the UpPTS, the sending subframe index of the SRS is 7.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 0;

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 6 and is the first time-domain symbol occupied by the UpPTS, the sending subframe index of the SRS is 5;

when the subframe index is 6 and is the second time-domain symbol occupied by the UpPTS, the sending subframe index of the SRS is 6;

when the subframe index is 6 and is the third time-domain symbol occupied by the UpPTS, the sending subframe index of the SRS is 7; or when the subframe index is 6 and is the fourth time-domain symbol occupied by the UpPTS, the sending subframe index of the SRS is 8.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 6 and is the first time-domain symbol occupied by the UpPTS, the sending subframe index of the SRS is 7; or when the subframe index is 6 and is the second time-domain symbol occupied by the UpPTS, the sending subframe index of the SRS is 8.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 6 and is the first time-domain symbol occupied by the UpPTS, the sending subframe index of the SRS is 6; or when the subframe index is 6 and is the second time-domain symbol occupied by the UpPTS, the sending subframe index of the SRS is 7.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 0;

when the subframe index is 1 and is the second time-domain symbol occupied by the UpPTS, the sending subframe index of the SRS is 1;

when the subframe index is 1 and is the third time-domain symbol occupied by the UpPTS, the sending subframe index of the SRS is 2;

when the subframe index is 1 and is the fourth time-domain symbol occupied by the UpPTS, the sending subframe index of the SRS is 3;

when the subframe index is 1 and is the fifth time-domain symbol occupied by the UpPTS, the sending subframe index of the SRS is 4;

when the subframe index is 1 and is the sixth time-domain symbol occupied by the UpPTS, the sending subframe index of the SRS is 5;

when the subframe index is 6 and is the first time-domain symbol occupied by the UpPTS, the sending subframe index of the SRS is 6:

when the subframe index is 6 and is the second time-domain symbol occupied by the UpPTS, the sending subframe index of the SRS is 7;

when the subframe index is 6 and is the third time-domain symbol occupied by the UpPTS, the sending subframe index of the SRS is 8;

when the subframe index is 6 and is the fourth time-domain symbol occupied by the UpPTS, the sending subframe index of the SRS is 9;

when the subframe index is 6 and is the fifth time-domain symbol occupied by the UpPTS, the sending subframe index of the SRS is 10; or when the subframe index is 6 and is the sixth time-domain symbol occupied by the UpPTS, the sending subframe index of the SRS is 11.

In the embodiment, the corresponding relationship among the subframe index, the UpPTS index and the sending subframe index of the SRS includes at least one of the following:

when the subframe index is 1 and is the first time-domain symbol occupied by the UpPTS, the sending subframe index of the SRS is 2;

when the subframe index is 1 and is the second time-domain symbol occupied by the UpPTS, the sending subframe index of the SRS is 3;

when the subframe index is 1 and is the third time-domain symbol occupied by the UpPTS, the sending subframe index of the SRS is 4;

when the subframe index is 1 and is the fourth time-domain symbol occupied by the UpPTS, the sending subframe index of the SRS is 5;

when the subframe index is 6 and is the first time-domain symbol occupied by the UpPTS, the sending subframe index of the SRS is 8;

when the subframe index is 6 and is the second time-domain symbol occupied by the UpPTS, the sending subframe index of the SRS is 9;

when the subframe index is 6 and is the third time-domain symbol occupied by the UpPTS, the sending subframe index of the SRS is 10; or when the subframe index is 6 and is the fourth time-domain symbol occupied by the UpPTS, the sending subframe index of the SRS is 11.

In the embodiment, when the SRS sending period is 1 or 2, the UE sends the SRS to the eNB on a subframe meeting the following relationship:

$$(A-B)\bmod 4=0,$$

or, $(A-B)\bmod 5=0,$ or, $(A-B)\bmod 6=0,$ where mod is a modulus operation function, A represents the sending subframe index of the SRS and B represents the SRS subframe offset value.

In the embodiment, the eNB indicates the time-domain symbol location for sending the SRS through RRC signaling, or, indicates the time-domain symbol location for sending the SRS through DL control signaling.

In the embodiment, when the SRS sending period M is shorter than 5 ms, the SRS sending period M represents that M SRS sending resources are configured in a half radio frame, or may represent that M SRS sending resources are configured in a newly added UpPTS of a special subframe of the half radio frame.

An embodiment of the disclosure further provides an Device for sending an SRS. The device is arranged to implement the abovementioned embodiment and preferred implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 4:
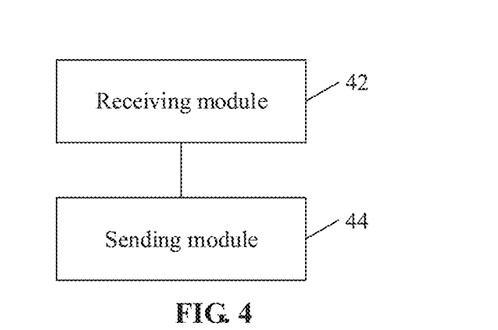
FIG. 4 is a first structure block diagram of an Device for sending an SRS according to an embodiment of the disclosure.

FIG. 4 is a first structure block diagram of an Device for sending an SRS according to an embodiment of the disclosure. The device is applied to UE, and as shown in FIG. 4, includes:

a receiving module 42, configured for the UE to receive predefined configuration information of an eNB; and a sending module 44, configured for the UE to send an SRS to the eNB on a time-domain symbol of a special subframe according to the predefined configuration information, wherein the time-domain symbol includes one or more of time-domain symbols occupied by an UpPTS, and a number of the time-domain symbols occupied by the UpPTS is N, wherein N is an integer no less than 3 and no greater than 12.

Figure 5:
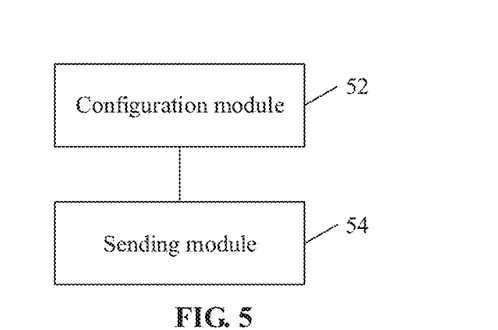
FIG. 5 is a second structure block diagram of an Device for sending an SRS according to an embodiment of the disclosure.

FIG. 5 is a second structure block diagram of an Device for sending an SRS according to an embodiment of the disclosure. As shown in FIG. 5, the device includes:

a configuration module 52, arranged to, before the SRS is sent to the eNB on the time-domain symbol of the special subframe, receive configuration information sent by the eNB, wherein the configuration information includes at least one of the following: an SRS sending period and subframe offset configuration of the UE, a corresponding relationship among a subframe index, an UpPTS index and a sending subframe index of the SRS, or indication information indicating a time-domain location for sending the SRS; and the sending module 54 is arranged to send the SRS to the eNB according to the configuration information.

It is to be noted that each module may be implemented through software or hardware and the latter condition may be implemented in, but not limited to, the following manners: the modules are all located in the same processor, or, the modules are located in multiple processors respectively.

According to the disclosure, the following manner is adopted: the UE sends the SRS to the eNB on at least one of the following of the special subframe: the one or more of the time-domain symbols occupied by the UpPTS, wherein, under the condition that all of time-domain symbols occupied by a GP in the special subframe do not support SRS sending, the number of the time-domain symbols occupied by the UpPTS is N, wherein N is an integer no less than 3 and no greater than 12, so that the problem of incapability in sending the SRS on the additional time-domain symbol is solved, and sending of the SRS on the added time-domain symbol is implemented.

The disclosure will be described below in combination with preferred embodiments and implementation modes in detail.

First Optional Embodiment of Preferred Embodiments of the Disclosure

An application scenario of the embodiment is that, in a TDD system, a UL-DL configuration is set to be 1 according to configuration information shown in Table 1, a DL subframe adopts a normal CP and a UL subframe adopts a normal CP.

For UE of Release 12 (Rel-12) or before Rel-12 (recorded as conventional UE), an eNB may set a special subframe configuration according to Table 2, and there is made such a hypothesis that a configuration 6 is adopted, that is, numbers of time-domain symbols occupied by a DwPTS, a GP and an UpPTS are 9, 3 and 2 respectively.

Figure 6:
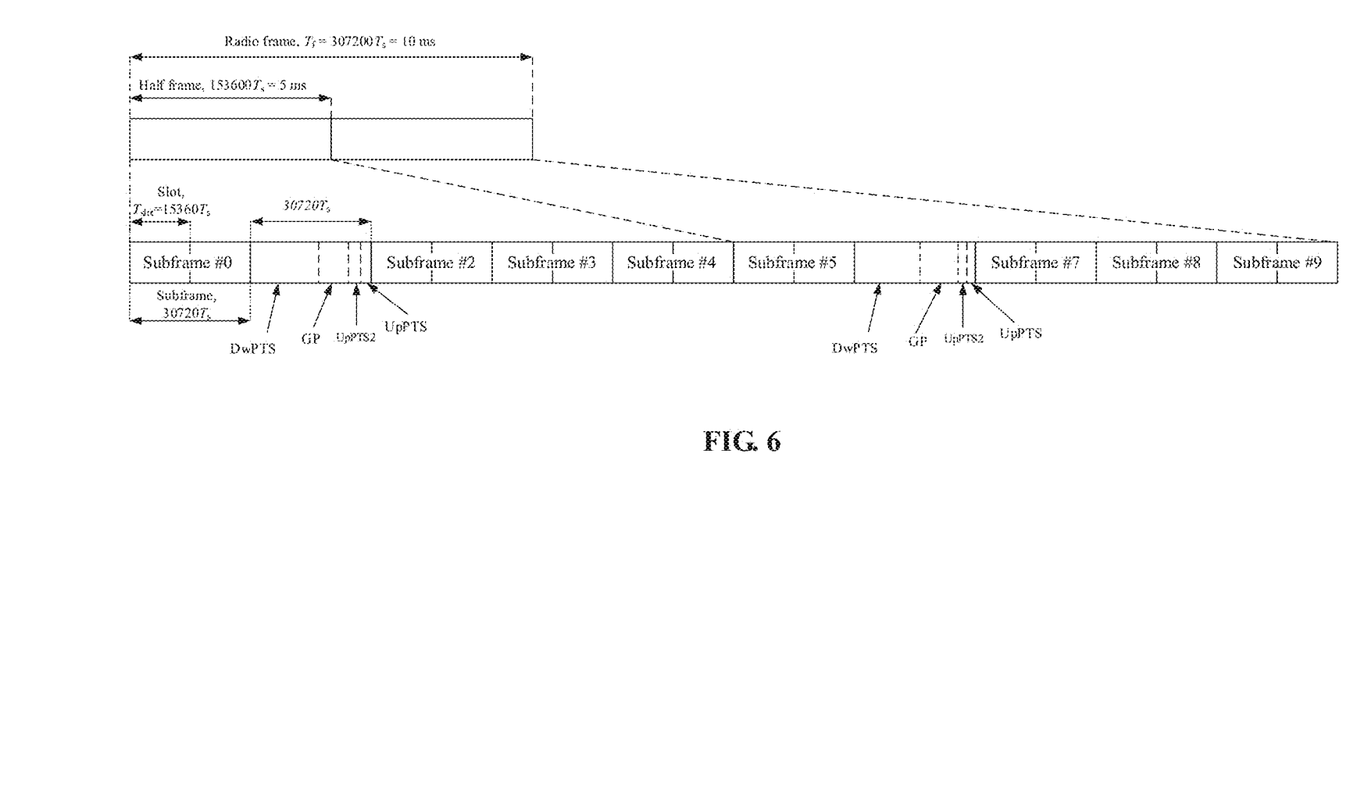
FIG. 6 is a schematic diagram of a time-domain location for sending an SRS on an UpPTS2 according to an optional embodiment of the disclosure.

For a UE of Rel-13 or after Rel-13 (recorded as new-version UE), the number (2 or 4) of symbols of a newly added UpPTS may be configured through RRC signaling, and the number of symbols of a DwPTS is equal to the number, represented by the special subframe configuration of the conventional UE, of symbols of the DwPTS. FIG. 6 is a schematic diagram of a time-domain location for sending an SRS on an UpPTS2 according to an optional embodiment of the disclosure. As shown in FIG. 6, the UpPTS2 is a newly added UpPTS available to send the SRS, and the UpPTS is an original UpPTS, available to send the SRS, of a system before Rel-13.

For the new-version UE, if the number, represented by a length of the UpPTS, of the time-domain symbols is 4, the eNB transmits configuration information to the UE through signaling, and the UE sends an SRS to the eNB according to the received configuration information or a predefined criterion, The configuration information or the predefined criterion includes: a user-specific SRS period and subframe offset configuration and a corresponding relationship among a subframe index, an UpPTS index and a sending subframe index $k_{SRS,r13}$ of the SRS.

Table 3 is a user-specific SRS period and subframe offset configuration table, as shown in Table 3:

Table 4 is a user-specific SRS period and subframe offset configuration table, as shown in Table 4;

Table 5 is a user-specific SRS period and subframe offset configuration table, as shown in Table 5;

Table 6 is a user-specific SRS period and subframe offset configuration table, as shown in Table 6; and Table 7 shows the corresponding relationship among the subframe index, the UpPTS index and the sending subframe index $k_{SRS,r13}$ of the SRS, as shown in Table 7.

For a periodic SRS, when an SRS period in the TDD system is 2, if the sending subframe index $k_{SRS,r13}$ of the SRS meets $(k_{SRS,r13}-T_{offset,r13})$ mod 4=0, the UE sends the SRS, wherein $T_{offset,r13}$ is an SRS subframe offset, and mod is a modulus operation function.

For an aperiodic SRS, when the SRS period in the TDD system is 2, if the sending subframe index $k_{SRS,r13}$ of the SRS meets $(k_{SRS,r13}-T_{offset,r13})$ mod 4=0, the UE sends the SRS, wherein $T_{offset,1,r13}$ is an SRS subframe offset, and mod is the modulus operation function.

TABLE 3

| SRS Configuration Index $I_{SRS\_r13}$ | SRS Periodicity $T_{SRS, r13}$ (ms) | SRS Subframe Offset $T_{offset, r13}$ |
|---|---|---|
| 0 | 2 | 0, 1 |
| 1 | 2 | 0, 2 |
| 2 | 2 | 0, 3 |
| 3 | 2 | 1, 2 |

TABLE 3-continued

| SRS Configuration Index $I_{SRS\_r13}$ | SRS Periodicity $T_{SRS, r13}$ (ms) | SRS Subframe Offset $T_{offset, r13}$ |
| --- | --- | --- |
| 4 | 2 | 1, 3 |
| 5 | 2 | 2, 3 |
| 6-9 | 5 | $I_{SRS\_r13} - 6$ |
| 10-13 | 10 | $I_{SRS\_r13} - 10$ |
| 14-15 | reserved | reserved |

TABLE 4

| SRS Configuration Index $I_{SRS\_r13}$ | SRS Periodicity $T_{SRS, r13}$ (ms) | SRS Subframe Offset $T_{offset, r13}$ |
| --- | --- | --- |
| 0 | 2 | 0, 1 |
| 1 | 2 | 0, 2 |
| 2 | 2 | 0, 3 |
| 3 | 2 | 1, 2 |
| 4 | 2 | 1, 3 |
| 5 | 2 | 2, 3 |

TABLE 4-continued

| SRS Configuration Index $I_{SRS\_r13}$ | SRS Periodicity $T_{SRS, r13}$ (ms) | SRS Subframe Offset $T_{offset, r13}$ |
| --- | --- | --- |
| 6 | 2 | 0, 1, 2 |
| 7 | 2 | 0, 1, 2, 3 |
| 8-11 | 5 | $I_{SRS\_r13} - 8$ |
| 12-15 | 10 | $I_{SRS\_r13} - 12$ |

TABLE 5

| SRS Configuration Index $I_{SRS, r13}$ | SRS Periodicity $T_{SRS, r13}$ (ms) | SRS Subframe Offset $T_{offset, r13}$ |
| --- | --- | --- |
| 0 | 2 | 0, 1 |
| 1 | 2 | 0, 2 |
| 2 | 2 | 1, 2 |

TABLE 5-continued

| SRS Configuration Index $I_{SRS, r13}$ | SRS Periodicity $T_{SRS, r13}$ (ms) | SRS Subframe Offset $T_{offset, r13}$ |
| --- | --- | --- |
| 3 | 2 | 0, 3 |
| 4 | 2 | 1, 3 |
| 5 | 2 | 2, 3 |
| 6 | 4 | 0, 1, 2, 3 |
| 7-10 | 5 | $I_{SRS} - 7$ |
| 11-18 | 10 | $I_{SRS} - 11$ |
| 19-34 | 20 | $I_{SRS} - 19$ |
| 35-63 | reserved | reserved |

TABLE 6

| SRS Configuration Index $I_{SRS, r13}$ | SRS Periodicity $T_{SRS, 1, r13}$ (ms) | SRS Subframe Offset $T_{offset, 1, r13}$ |
| --- | --- | --- |
| 0-3 | 5 | $I_{SRS\_r13}$ |
| 4-7 | 10 | $I_{SRS\_r13} - 4$ |

TABLE 7

| | Subframe index n | | | | | | |
| --- | --- | --- | --- | --- | --- | --- | --- |
| | 1 | | | | | | |
| | 0 | First UpPTS symbol | Second UpPTS symbol | Third UpPTS symbol | Fourth UpPTS symbol | 2 | 3 | 4 |
| $k_{SRS, r13}$ when the time-domain length of the newly added UpPTS is 2 symbols | | 2 | 3 | | | | | |
| $k_{SRS, r13}$ when the time-domain length of the newly added UpPTS is 4 symbols | | 0 | 1 | 2 | 3 | | | |
| | Subframe index n | | | | | | |
| | 6 | | | | | | |
| | 5 | First UpPTS symbol | Second UpPTS symbol | Third UpPTS symbol | Fourth UpPTS symbol | 7 | 8 | 9 |
| $k_{SRS, r13}$ when the time-domain length of the newly added UpPTS is 2 symbols | | 6 | 7 | | | | | |
| $k_{SRS, r13}$ when the time-domain length of the newly added UpPTS is 4 symbols | | 4 | 5 | 6 | 7 | | | |

Second Optional Embodiment of the Preferred Embodiments of the Disclosure

An application scenario of the embodiment is that, in a TDD system, a UL-DL configuration is set to be 1 according to configuration information shown in Table 1, a DL subframe adopts a normal CP and a UL subframe adopts a normal CP.

For a UE of Rel-12 or before Rel-12 (recorded as conventional UE), an eNB may set a special subframe configuration according to Table 2, and there is made such a hypothesis that a configuration 6 is adopted, that is, numbers of time-domain symbols occupied by a DwPTS, a GP and an UpPTS are 9, 3 and 2 respectively.

For UE of Rel-13 or after Rel-13 (recorded as new-version UE), the number (2 or 4) of symbols of a newly added UpPTS may be configured through RRC signaling, and the number of symbols of a DwPTS is equal to a number, represented by the special subframe configuration of the conventional UE, of symbols of the DwPTS. As shown in FIG. 6, an UpPTS2 is a newly added UpPTS available to send an SRS, and the UpPTS is an original UpPTS, available to send the SRS, of a system before Rel-13 and occupies 1 or 2 time-domain symbols.

For the new-version UE, if the number, represented by a length of the UpPTS, of the time-domain symbols is 4, the eNB transmits configuration information to the UE through signaling, and the UE sends an SRS to the eNB according to the received configuration information or a predefined criterion, wherein the configuration information or the predefined criterion includes: a user-specific SRS period and subframe offset configuration and a corresponding relationship among a subframe index, an UpPTS index and a sending subframe index $k_{SRS,r13}$ of the SRS.

Table 8 is a user-specific SRS period and subframe offset configuration table, as shown in Table 8; and Table 9 shows the corresponding relationship among the subframe index, the UpPTS index and the sending subframe index $k_{SRS,r13}$ of the SRS, as shown in Table 9.

When an SRS period in the TDD system is 2, if the sending subframe index $k_{SRS,r13}$ of the SRS meets ($k_{SRS,r13}$ − $T_{offset,r13}$) mod 5=0 the UE sends the SRS. $T_{offset,r13}$ is an SRS subframe offset, and mod is a modulus operation function.

TABLE 8

| SRS Configuration Index $I_{SRS,\,r13}$ | SRS Periodicity $T_{SRS,\,r13}$ (ms) | SRS Subframe Offset $T_{offset,\,r13}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

TABLE 9

| | Subframe index n | | | | | | | |
|---|---|---|---|---|---|---|---|---|
| | 1 | | | | | | | |
| | 0 | First UpPTS symbol | Second UpPTS symbol | Third UpPTS symbol | Fourth UpPTS symbol | 2 | 3 | 4 |
| $k_{SRS,\,r13}$ when the time-domain length of the newly added UpPTS is 2 symbols | | 2 | 3 | | | | | |
| $k_{SRS,\,r13}$ when the time-domain length of the newly added UpPTS is 4 symbols | | 0 | 1 | 2 | 3 | | | |
| | Subframe index n | | | | | | | |
| | 6 | | | | | | | |
| | 5 | First UpPTS symbol | Second UpPTS symbol | Third UpPTS symbol | Fourth UpPTS symbol | 7 | 8 | 9 |
| $k_{SRS,\,r13}$ when the time-domain length of the newly added UpPTS is 2 symbols | | 7 | 8 | | | | | |
| $k_{SRS,\,r13}$ when the time-domain length of the newly added UpPTS is 4 symbols | | 5 | 6 | 7 | 8 | | | |

Third Optional Embodiment of the Preferred Embodiments of the Disclosure

An application scenario of the embodiment is that, in a TDD system,

UE sends an SRS to an eNB according to predefined configuration information. The predefined configuration information includes at least one of the following: determining a time-domain symbol location for sending the SRS according to parity of a sequence number of a subframe n where an SRS triggering request detected by the UE is located, or determining the time-domain symbol location for sending the SRS according to a range of the subframe n where the SRS triggering request detected by the UE is located.

When the sequence number of the subframe n where the SRS triggering request detected by the UE is located is an odd number, it is predefined that the aperiodic SRS is sent on a newly added UpPTS or a UE-specific UpPTS of standard Rel-13 and later, and when the sequence number of the subframe n where the SRS triggering request detected by the UE is located is an even number, it is predefined that the aperiodic SRS is sent on a conventional UpPTS; or, when the sequence number of the subframe n where the SRS triggering request detected by the UE is located is an even number, it is predefined that the aperiodic SRS is sent on the newly added UpPTS or the UE-specific UpPTS of standard Rel-13 and later, and when the sequence number of the subframe n where the SRS triggering request detected by the UE is located is an odd number, it is predefined that the aperiodic SRS is sent on the conventional UpPTS.

The operation that the time-domain symbol location for sending the SRS is determined according to the range of the subframe n where the SRS triggering request detected by the UE is located includes that:

when the sequence number of the subframe n where the SRS triggering request detected by the UE is located is 0 or 1 or 3 or 4, it is predefined that the aperiodic SRS is sent on the newly added UpPTS or the UE-specific UpPTS of standard Rel-13 and later, and when the sequence number of the subframe n where the SRS triggering request detected by the UE is located is 5 or 6 or 8 or 9, it is predefined that the aperiodic SRS is sent on the conventional UpPTS; or, when the sequence number of the subframe n where the SRS triggering request detected by the UE is located is 5 or 6 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 3 or 4, it is predefined that the aperiodic SRS is sent on the conventional UpPTS; or, when the sequence number of the subframe n where the SRS triggering request detected by the UE is located is 3 or 4 or 8 or 9, it is predefined that the aperiodic SRS is sent on the newly added UpPTS or the UE-specific UpPTS of standard Rel-13 and later, and when the sequence number of the subframe n where the SRS triggering request detected by the UE is located is 0 or 1 or 5 or 6, it is predefined that the aperiodic SRS is sent on the conventional UpPTS.

Fourth Optional Embodiment of the Preferred Embodiments of the Disclosure

An eNB indicates a time-domain symbol location for sending an SRS through RRC signaling or DL control signaling, for example, 1-bit RRC signaling or DL control signaling is adopted for indication, when a state of the RRC signaling or the DL control signaling is 0, UE is indicated to send the aperiodic SRS on a conventional UpPTS, and when the state of the RRC signaling or the DL control signaling is 1, the UE is indicated to send the aperiodic SRS on a newly added UpPTS or a UE-specific UpPTS of standard Rel-13 and later;

or, when the state of the RRC signaling or the DL control signaling is 1, the UE is indicated to send the aperiodic SRS on the conventional UpPTS, and when the state of the RRC signaling or the DL control signaling is 0, the UE is indicated to send the aperiodic SRS on the newly added UpPTS or the UE-specific UpPTS of standard Rel-13 and later;

here, the conventional UpPTS is an UpPTS occupying last two or last one time-domain symbol in a special subframe, and the newly added UpPTS is a newly added UpPTS in standard Rel-13.

From the descriptions about the above implementation modes, those skilled in the art may clearly learn about that the method according to the embodiments may be implemented in a manner of combining software and a necessary universal hardware platform and may, of course, also be implemented through hardware, but the former is a preferred implementation mode under many conditions. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions arranged to enable a piece of terminal equipment (which may be a mobile phone, a computer, a server, network equipment or the like) to execute the method of each embodiment of the disclosure.

An embodiment of the disclosure further provides a storage medium. Optionally, in the embodiment, the storage medium may be arranged to store a program for executing the method steps of the abovementioned embodiment.

Optionally, the storage medium is further arranged to store the program codes for executing the method steps of the abovementioned embodiment.

Optionally, in the embodiment, the storage medium may include, but not limited to: various media capable of storing program codes such as a U disk, a ROM, a RAM, a mobile hard disk, a magnetic disk or an optical disk.

Optionally, in the embodiment, a processor executes the method steps of the abovementioned embodiment according to the program code stored in the storage medium.

Optionally, specific examples in the embodiment may refer to examples described in the abovementioned embodiments and optional implementation modes and will not be elaborated in the embodiment.

Obviously, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

The technical solutions provided by the embodiments of the disclosure may be applied to an SRS sending process. The UE sends the SRS to the eNB on the time-domain symbol of the special subframe. The time-domain symbol includes the one or more time-domain symbols in the time-domain symbols occupied by the UpPTS, and the number of the time-domain symbols occupied by the UpPTS is N, wherein N is an integer no less than 3 and no greater than 12. The problem that a technical solution of sending an SRS on a time-domain symbol is imperfect is solved, and sending of the SRS on the added time-domain symbol is implemented.

The invention claimed is:

1. A method for sending a Sounding Reference Signal (SRS), comprising:
  receiving, by a user equipment (UE) of Release(Rel)-13 or after Rel-13, RRC signaling sent by the base station, wherein the RRC signaling is used for indicating a number of symbols of an additional uplink pilot time slot (UpPTS) configured in a special subframe as 2 or 4, and after the additional UpPTS is configured in the special subframe, a number of symbols of a downlink pilot slot (DwPTS) in the special subframe is equal to a number of symbols of a DwPTS in a special subframe configuration of a UE of Rel-12 or before Rel-12; and
  sending, by the UE of Rel-13 or after Rel-13, the SRS on the symbols of the additional UpPTS to the base station according to a predefined criterion,
  wherein the predefined criterion comprises a corresponding relationship among a subframe index, an UpPTS index and a sending subframe index of the SRS; wherein the corresponding relationship among the subframe index, the UpPTS index and the sending subframe index of the SRS satisfies:
  in response to a time-domain length of an additional UpPTS being two symbols, the corresponding relationship among the subframe index, the UpPTS index and the sending subframe index of the SRS comprises at least one of the following:
  in response to the subframe index being 1 and the time-domain symbol being a first time-domain symbol occupied by the additional UpPTS, the sending subframe index of the SRS is 2;
  in response to the subframe index being 1 and the time-domain symbol being a second time-domain symbol occupied by the additional UpPTS, the sending subframe index of the SRS is 3;
  in response to the subframe index being 6 and the time-domain symbol being the first time-domain symbol occupied by the additional UpPTS, the sending subframe index of the SRS is 7; or
  in response to the subframe index being 6 and the time-domain symbol being the second time-domain symbol occupied by the additional UpPTS, the sending subframe index of the SRS is 8.

2. A device for sending a Sounding Reference Signal (SRS), applied to a User Equipment (UE), the device comprising:
  a processor; and
  a memory storing instructions executable by the processor;
  wherein the processor is arranged to perform the following:
  receiving, by a user equipment (UE) of Release(Rel)-13 or after Rel-13, RRC signaling sent by the base station, wherein the RRC signaling is used for indicating a number of symbols of an additional uplink pilot time slot (UpPTS) configured in a special subframe as 2 or 4, and after the additional UpPTS is configured in the special subframe, a number of symbols of a downlink pilot slot (DwPTS) in the special subframe is equal to a number of symbols of a DwPTS in a special subframe configuration of a UE of Rel-12 or before Rel-12; and
  sending, by the UE of Rel-13 or after Rel-13, the SRS on the symbols of the additional UpPTS to the base station according to a predefined criterion, wherein the predefined criterion comprises a corresponding relationship among a subframe index, an UpPTS index and a sending subframe index of the SRS; wherein the corresponding relationship among the subframe index, the UpPTS index and the sending subframe index of the SRS satisfies:
  in response to a time-domain length of an additional UpPTS being two symbols, the corresponding relationship among the subframe index, the UpPTS index and the sending subframe index of the SRS comprises at least one of the following:
  in response to the subframe index being 1 and the time-domain symbol being a first time-domain symbol occupied by the additional UpPTS, the sending subframe index of the SRS is 2;
  in response to the subframe index being 1 and the time-domain symbol being a second time-domain symbol occupied by the additional UpPTS, the sending subframe index of the SRS is 3;
  in response to the subframe index being 6 and the time-domain symbol being the first time-domain symbol occupied by the additional UpPTS, the sending subframe index of the SRS is 7; or
  in response to the subframe index being 6 and the time-domain symbol being the second time-domain symbol occupied by the additional UpPTS, the sending subframe index of the SRS is 8.

* * * * *